(12) United States Patent
Huang

(10) Patent No.: US 11,500,172 B2
(45) Date of Patent: Nov. 15, 2022

(54) OPTICAL MODULE AND PROJECTOR

(71) Applicant: Coretronic Corporation, Hsin-Chu (TW)

(72) Inventor: Shou-Cheng Huang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 365 days.

(21) Appl. No.: 16/886,766

(22) Filed: May 28, 2020

(65) Prior Publication Data

US 2020/0379203 A1 Dec. 3, 2020

(30) Foreign Application Priority Data

May 29, 2019 (CN) .......................... 201910455681.3

(51) Int. Cl.
| | |
|---|---|
| *G02B 7/182* | (2021.01) |
| *G02B 7/02* | (2021.01) |
| *G02B 27/64* | (2006.01) |
| *G02B 27/18* | (2006.01) |

(52) U.S. Cl.
CPC .............. *G02B 7/02* (2013.01); *G02B 27/18* (2013.01); *G02B 27/646* (2013.01)

(58) Field of Classification Search
CPC ........ G02B 7/18; G02B 7/182; G02B 7/1821; G02B 7/1827; G02B 7/00; G02B 7/02; G02B 27/18; G02B 27/646
USPC ...................................................... 359/198.1
See application file for complete search history.

(56) References Cited

U.S. PATENT DOCUMENTS

| | | | | |
|---|---|---|---|---|
| 6,095,334 | A | * | 8/2000 | Belveal .................. A45D 42/04 206/823 |
| 8,162,502 | B1 | * | 4/2012 | Zadro .................. F21V 33/004 362/427 |
| 8,210,692 | B2 | * | 7/2012 | Yoshimura ............... G02B 5/10 359/872 |
| 2002/0030903 | A1 | | 3/2002 | Lu |

(Continued)

FOREIGN PATENT DOCUMENTS

| | | |
|---|---|---|
| CN | 100589005 | 2/2010 |
| CN | 101713500 | 5/2010 |

(Continued)

OTHER PUBLICATIONS

"Office Action of China Counterpart Application", dated Jun. 16, 2021, p. 1-p. 7.

(Continued)

*Primary Examiner* — William R Alexander
(74) *Attorney, Agent, or Firm* — JCIPRNET

(57) ABSTRACT

The disclosure provides an optical module comprising a first frame, a second frame, a pillar and an optical component. The first frame has an adjustment portion, and the adjustment portion has a guiding slot. The second frame is rotatably connected to the first frame along the first axis. The pillar is connected to the second frame and is disposed through the guiding slot. The pillar is configured to be subjected to force and swing in the guiding slot to drive the second frame to rotate around the first axis. The optical component is disposed on the second frame. In addition, a projector with the optical module is also disclosed, and the rotation angle of the optical component can be accurately adjusted by the optical module.

20 Claims, 9 Drawing Sheets

(56) References Cited

U.S. PATENT DOCUMENTS

| | | | | |
|---|---|---|---|---|
| 2004/0089584 A1* | 5/2004 | Zadro | ............... | A45D 33/008 |
| | | | | 206/581 |
| 2007/0195441 A1* | 8/2007 | Aizawa | ............... | G03B 21/28 |
| | | | | 359/871 |
| 2010/0026971 A1* | 2/2010 | Okura | ............... | G03B 21/10 |
| | | | | 353/99 |
| 2010/0085543 A1* | 4/2010 | Yoshimura | ........... | H04N 9/3191 |
| | | | | 353/98 |
| 2010/0085544 A1* | 4/2010 | Yoshimura | ......... | G03B 21/2013 |
| | | | | 362/232 |
| 2018/0314029 A1 | 11/2018 | Lee et al. | | |

FOREIGN PATENT DOCUMENTS

| | | |
|---|---|---|
| CN | 202305959 | 7/2012 |
| CN | 102902043 | 1/2013 |
| CN | 103186017 | 7/2013 |
| CN | 105403975 | 3/2016 |
| CN | 106482033 | 3/2017 |
| CN | 106918975 | 7/2017 |
| CN | 107703601 | 2/2018 |
| CN | 208705651 | 4/2019 |
| CN | 209784718 | 12/2019 |
| JP | 2001033873 | 2/2001 |

OTHER PUBLICATIONS

"Office Action of China Counterpart Application", dated Apr. 6, 2021, p. 1-p. 6.

* cited by examiner

OPTICAL MODULE AND PROJECTOR

CROSS-REFERENCE TO RELATED APPLICATION

This application claims the priority benefit of China application serial no. 201910455681.3, filed on May 29, 2019. The entirety of the above-mentioned patent application is hereby incorporated by reference herein and made a part of this specification.

BACKGROUND

Technical Field

The disclosure relates to an optical module and a projector, and in particular to an optical module and a projector capable of adjusting a rotation angle of an optical component.

Description of Related Art

The projector is a display device for generating a large-size image. The imaging principle of the projector is to convert the illumination beam generated by the light source into an image beam by a light valve, and then project the image beam onto the screen or the wall by the projection lens.

In general, the illumination beam and the image beam are guided along a predetermined transmission path by the guidance of various optical components of the optical module within the projector. When the projector is shipped from the factory, the optical components in the projector must be adjusted to an accurate angle to achieve a good projection effect. In addition, vibration may occur during the use or movement of the projector, which may cause an angular shift of the optical component, and which may cause the illumination beam and the image beam to deviate from the predetermined transmission path. Therefore, the optical module in the projector must be equipped with a corresponding adjustment mechanism to facilitate the adjustment before shipping from the factory and the subsequent maintenance adjustment, so that the optical component is restored to an accurate angle. With the miniaturization trend of the projector and the demand for high quality of projection, it is an important issue in the design of adjustment mechanism to find out how to accurately adjust the rotation angle of the optical component by a simplified adjustment mechanism.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The disclosure provides an optical module and a projector, which can accurately adjust the rotation angle of the optical component by a simplified adjustment mechanism.

The objectives and advantages of the disclosure may be further understood in the technical features disclosed in the disclosure.

To achieve one or a part or all the objectives or other objectives, an embodiment of the present disclosure provides an optical module including a first frame, a second frame, a pillar, and an optical component. The first frame has an adjustment portion, and the adjustment portion has a guiding slot. The second frame is rotatably connected to the first frame along the first axis. The pillar is connected to the second frame and is disposed through the guiding slot. The pillar is configured to be subjected to force and swing in the guiding slot to drive the second frame to rotate around the first axis. The optical component is disposed on the second frame.

To achieve one or a part or all the objectives or other objectives, an embodiment of the present disclosure provides a projector including a light source, a light valve, a projection lens, and an optical module. The light valve is disposed on the transmission path of the illumination beam and configured to convert the illumination beam into an image beam. The projection lens is disposed on the transmission path of the image beam and configured to project the image beam to the outside of the projector. The optical module includes a first frame, a second frame, a pillar, and an optical component. The first frame has an adjustment portion, and the adjustment portion has a guiding slot. The second frame is rotatably connected to the first frame along the first axis. The pillar is connected to the second frame and is disposed through the guiding slot. The pillar is configured to be subjected to force and swing in the guiding slot to drive the second frame to rotate around the first axis. The optical component is disposed on the second frame and is located on the transmission path of the illumination beam or the image beam.

Based on the above, embodiments of the present disclosure have at least one of the following advantages or effects. In the optical module of the embodiment of the present disclosure, the second frame and the optical component are driven through the pillar swinging along the guiding slot to rotate around the first axis, so that the user can directly move the pillar to complete the adjustment operation on the first axis without using additional tools to make the adjustment, thereby improving operational convenience.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
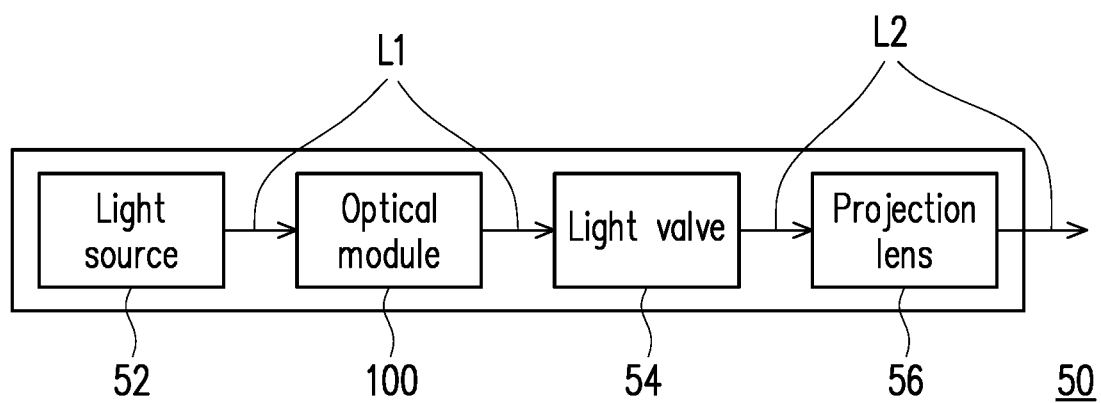
FIG. 1 is a schematic view of a projector according to an embodiment of the present disclosure.

FIG. 1 is a schematic view of a projector 50 according to an embodiment of the present disclosure. Referring to FIG. 1, the projector 50 of the embodiment includes a light source 52, a light valve 54, and a projection lens 56. The light source 52 is configured to provide an illumination beam L1. The light valve 54 is disposed on the transmission path of the illumination beam L1 and is configured to convert the illumination beam L1 into an image beam L2. The projection lens 56 is disposed on the transmission path of the image light beam L2 and is configured to project the image beam L2 to the outside of the projector 50. In addition, the projector 50 further includes an optical module 100 disposed on the transmission path of the illumination beam L1. In other embodiments, the optical module 100 can also be disposed on the transmission path of the image beam L2, the present disclosure provides no limitation thereto.

Figure 2:
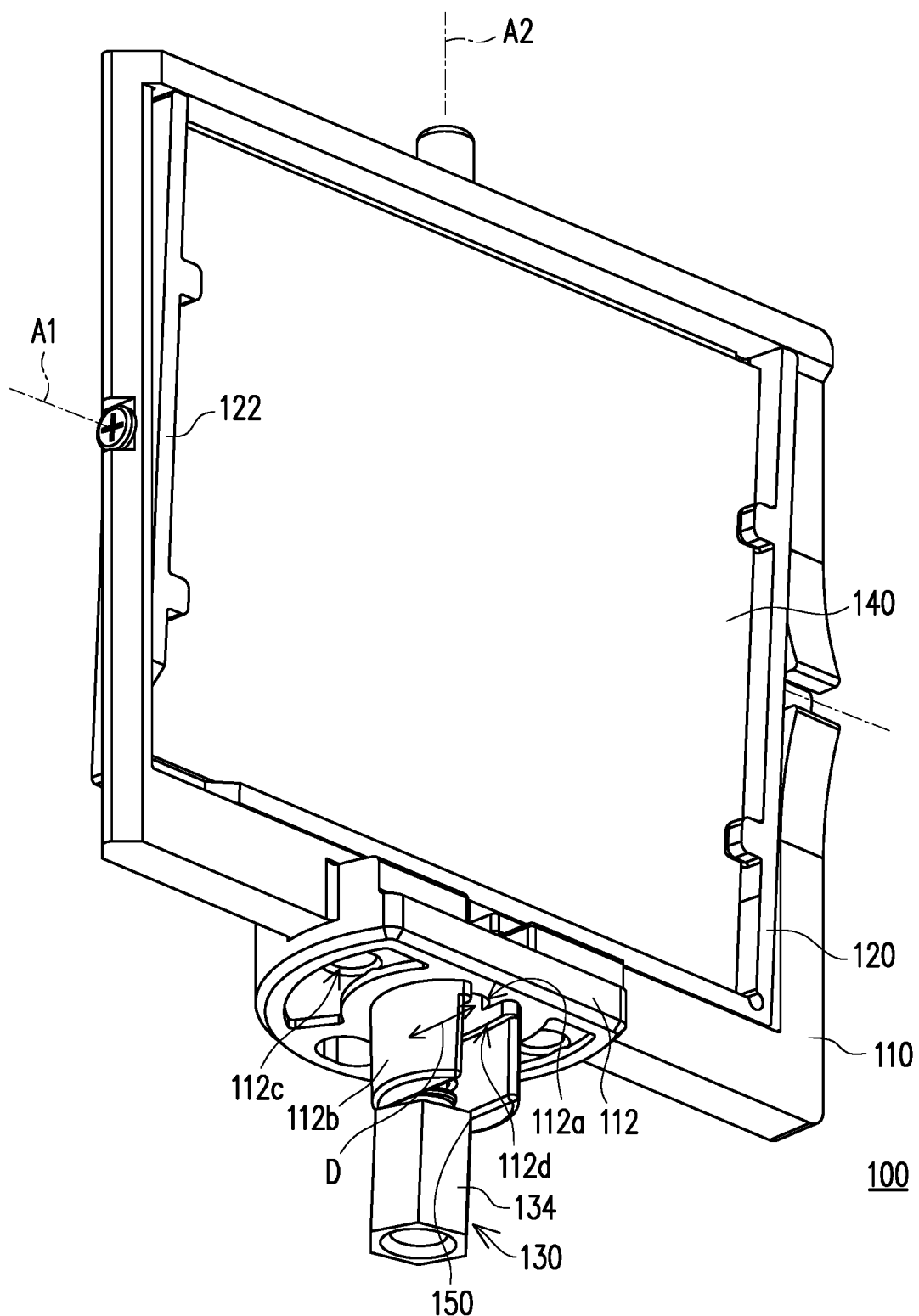
FIG. 2 is a perspective view of the optical module of FIG. 1.
Figure 3:
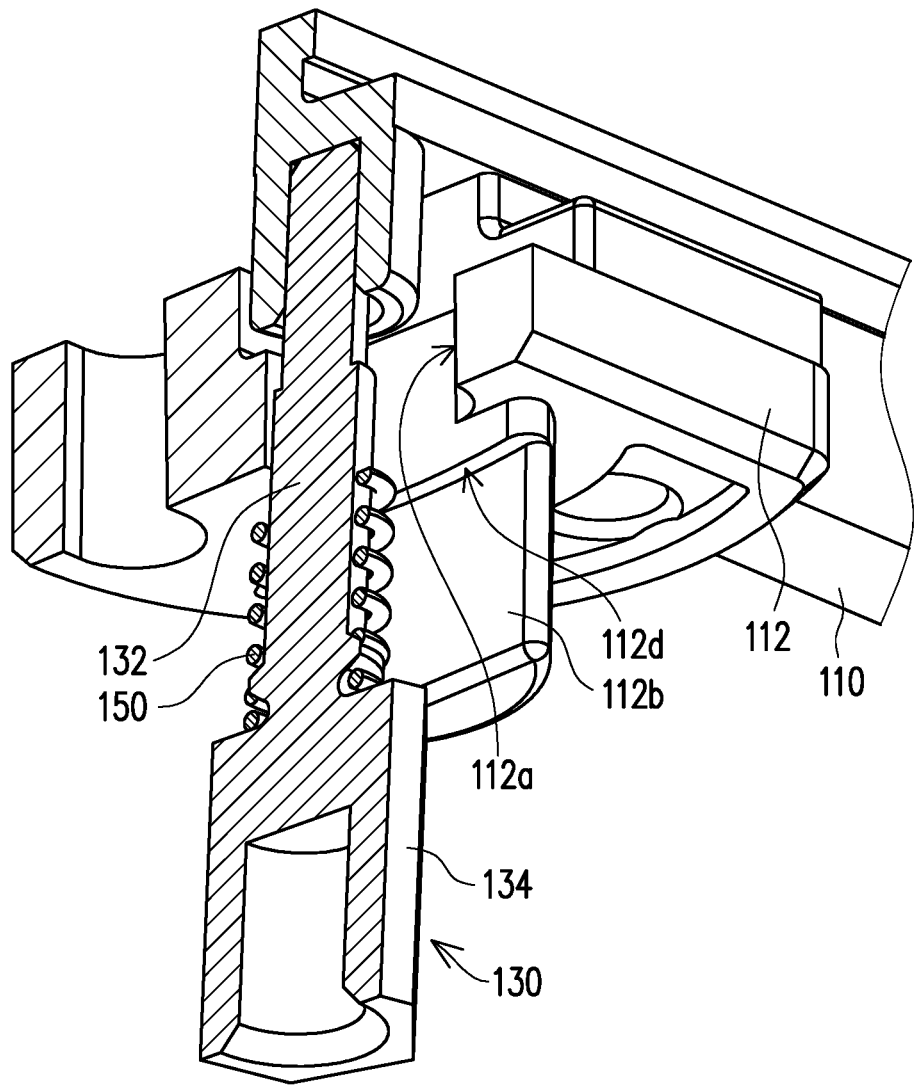
FIG. 3 illustrates a partial structure of the optical module of FIG. 2.

FIG. 2 is a perspective view of the optical module 100 of FIG. 1. FIG. 3 illustrates a partial structure of the optical module 100 of FIG. 2. Referring to FIG. 2 and FIG. 3, the optical module 100 includes a first frame 110, a second frame 120, a pillar 130, and an optical component 140. The first frame 110 has an adjustment portion 112. The adjustment portion 112 has a guiding slot 112a and a shaft portion 112b and is rotatably connected to a base body along a second axis A2 through the shaft portion 112b. The base body can be a housing of the projector 50 or other suitable structure, the present disclosure provides no limitation thereto. The adjustment portion 112 is configured to engage with the jig and drive the first frame 110 to rotate around the second axis A2 through the force of the jig. The jig applies force to the adjustment portion 112 in the manner of, for example, inserting into an adjustment hole 112c of the adjustment portion 112, but the present disclosure is not limited thereto.

Figure 4A:
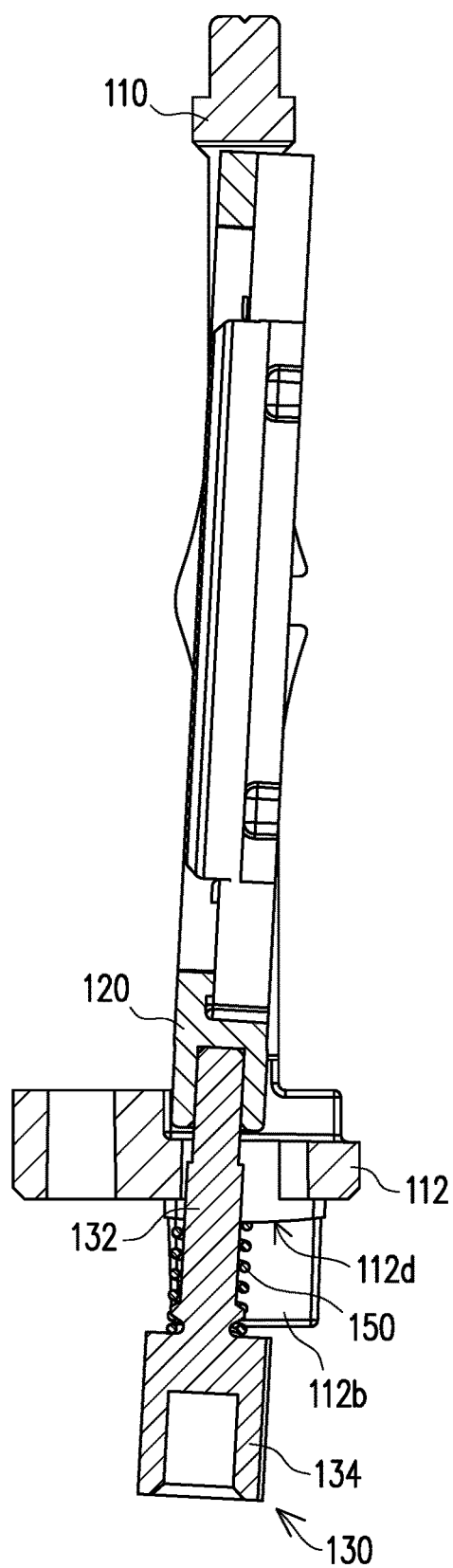
FIG. 4A and FIG. 4B illustrate swinging of the pillar of FIG. 2.
Figure 4B:
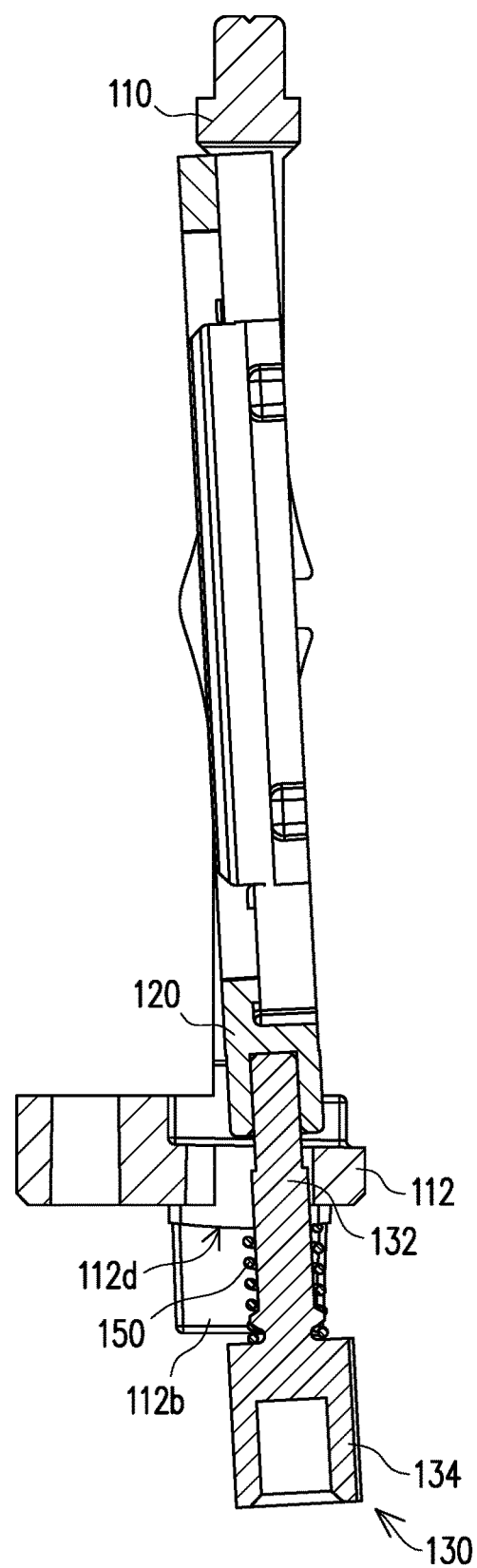

The second frame 120 is rotatably connected to the first frame 110 along a first axis A1 perpendicular to the second axis A2. The pillar 130 is, for example, a stud and is connected to the second frame 120 in a screwed manner. The pillar 130 passes through the shaft portion 112b and is disposed through the guiding slot 112a. The extending direction D of the guiding slot 112a is perpendicular to the first axis A1 and the second axis A2, for example. FIG. 4A and FIG. 4B illustrate swinging of the pillar of FIG. 2. In order to make the drawings clearer, FIG. 4A and FIG. 4B only show part of the structure of the optical module 100. The pillar 130 is configured to be subjected to force and swing from the position shown in FIG. 4A to the position shown in FIG. 4B along the guiding slot 112a, thereby driving the second frame 120 to rotate around the first axis A1. The optical component 140 is, for example, a dichroic lens disposed on the second frame 120 and located on the transmission path of the image beam L2. In other embodiments, the optical component 140 can be other kinds of light transmitting components or reflective components, and can be located on the transmission path of the illumination beam L1, the present disclosure is not limited thereto.

In the above configuration, the optical module 100 drives the second frame 120 and the optical component 140 to rotate around the first axis A1 through the pillar 130 swinging along the guiding slot 112a, so that the user can directly move the pillar 130 to complete the adjustment operation on the first axis A1 without using an additional tool to perform the adjustment, thereby improving the convenience of operation. Further, the adjustment portion 112 of the first frame 110 is not only configured to drive the first frame 110 to rotate around the second axis A2, but also configured for the pillar 130 to pass through, such that the second frame 120 is driven to rotate around the first axis A1 through the pillar 130 swinging relative to the adjustment portion 112. That is, the optical module 100 integrates the adjustment operation on the first axis A1 and the adjustment operation on the second axis A2 at the adjustment portion 112, so that the overall structure of the optical module 100 is relatively simplified, thereby saving the configuration space inside the projector 50 and reducing manufacturing and assembling costs. Moreover, the user can complete the adjustment operation on the first axis A1 and the adjustment operation on the second axis A2 by only operating the pillar 130 and the adjustment portion 112 from a single side of the projector 50, thereby facilitating the adjustment operation.

The optical module 100 of the embodiment of the disclosure further includes an elastic member 150. The pillar 130 includes a passing-through portion 132 and a stopping portion 134. The passing-through portion 132 is disposed through the guiding slot 112a and is connected between the stopping portion 134 and the second frame 120. The elastic member 150 is, for example, a compression spring and sleeved through the pillar 130 and disposed between the stopping portion 134 and the adjustment portion 112. The pillar 130 is configured to swing along the guiding slot 112a against the elastic force of the elastic member 150, and is positioned by the elastic force of the elastic member 150. In more detail, the adjustment portion 112 of the embodiment has at least one convex arc surface 112d. The opposite two ends of the elastic member 150 abut against the convex arc surface 112d and the stopping portion 134 respectively to provide an elastic force for positioning the pillar 130. In addition, the convex arc surface 112d is, for example, a partial cylindrical surface, and the first axis A1 passes through the center of curvature of the convex arc surface 112d, for example. That is, the highest point of the cylindrical surface will be located at the middle portion of the guiding slot 112a, so that the pillar 130 and the elastic member 150 can swing smoothly through the guidance of the convex arc surface 112d.

The second frame 120 of the embodiment has at least one shaft portion 122 and is pivotally connected to the first frame 110 along the first axis A1 through the shaft portion 122. The shaft portion 122 is, for example, a shaft hole and the number thereof is, for example, two and respectively located on opposite two sides of the second frame 120, and located on the first axis A1. In other embodiments, the form, number, and arrangement position of the shaft portion 122 can be changed as needed, and the present disclosure provides no limitation thereto. In this embodiment, the first axis A1 and the second axis A2 pass through the geometric center of the optical component 140, for example, so that the geometric center of the optical component 140 does not shift during the above adjustment process to maintain good light emitting efficiency and imaging quality.

Figure 5:
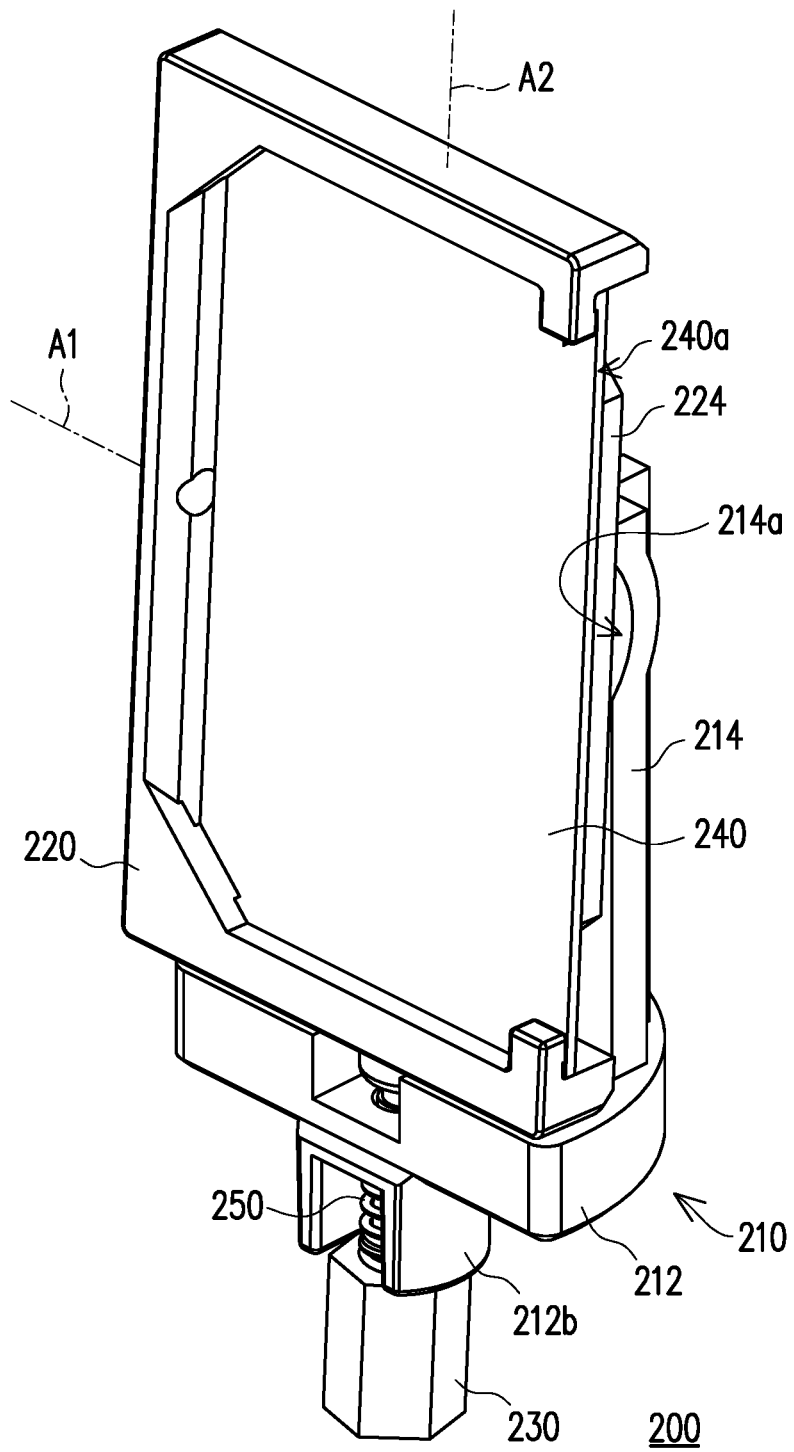
FIG. 5 is a perspective view of an optical module according to another embodiment of the present disclosure.
Figure 6A:
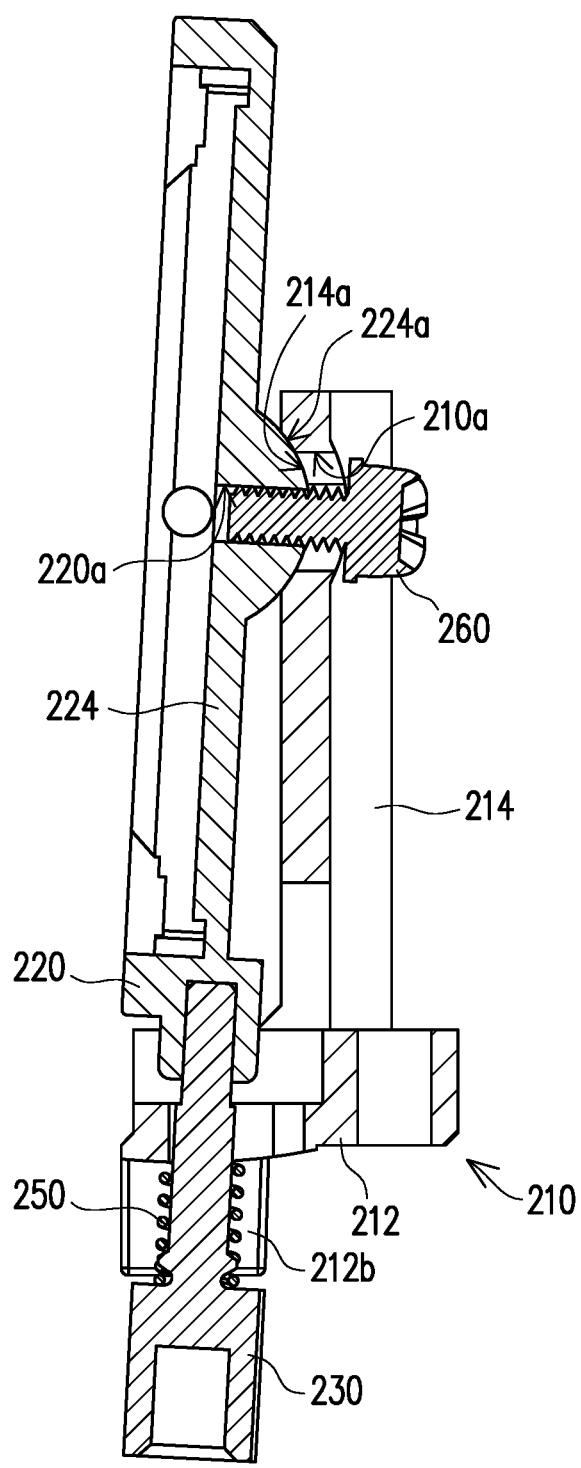
FIG. 6A and FIG. 6B illustrate the movement of adjustment member of FIG. 5.
Figure 6B:
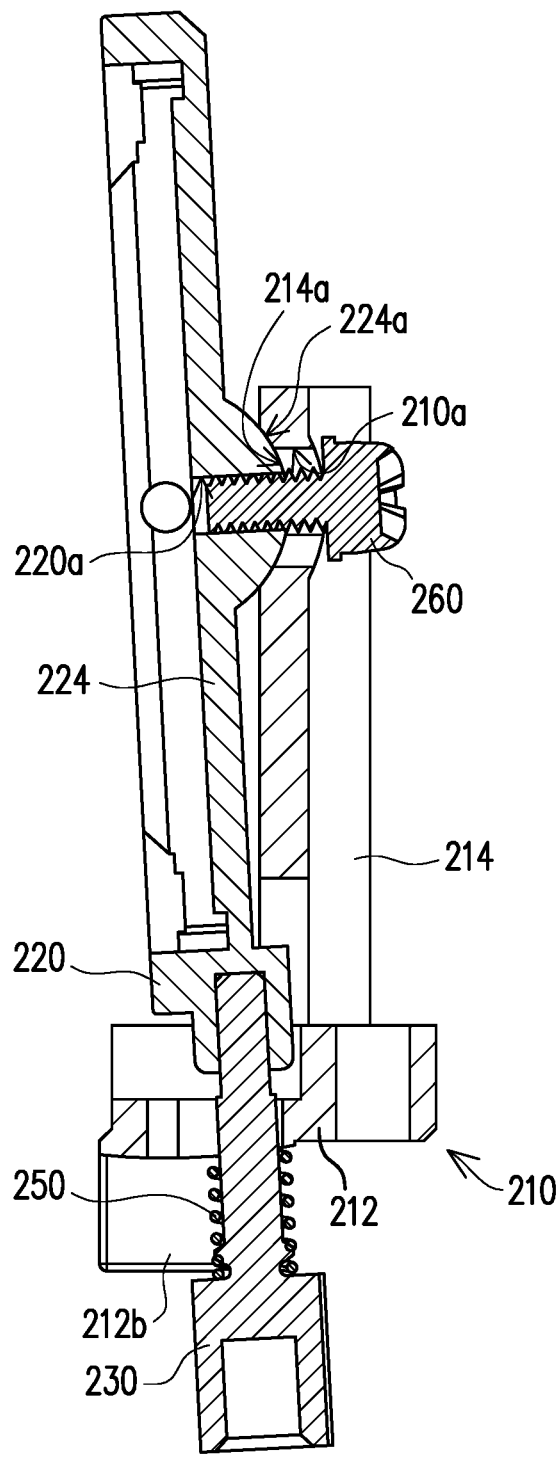

FIG. 5 is a perspective view of an optical module 200 according to another embodiment of the present disclosure. FIG. 6A and FIG. 6B illustrate the movement of adjustment member of FIG. 5. In the optical module 200 shown in FIG. 5, FIG. 6A and FIG. 6B, the arrangement and operation of the first frame 210, the adjustment portion 212, the shaft portion 212b, the second frame 220, the pillar 230, the optical component 240, and the elastic member 250 are similar to the arrangement and operation of the first frame 110, the adjustment portion 112, the shaft portion 112b, the second frame 120, the adjustment member 130, the optical component 140, and the elastic member 150 of the foregoing embodiment, and related details are not repeated herein.

The difference between the optical module 200 and the optical module 100 is that the optical component 240 is, for example, a reflective component, and the light does not need to pass through the optical component 240. Therefore, the first frame 210 and the second frame 220 can respectively have a first back plate portion 214 and a second back plate portion 224. The second back plate portion 224 covers the back surface of the optical component 240. The second back plate portion 224 and the first back plate portion 214 can stop each other to limit the range of movement of the second back plate portion 224.

In addition, the first back plate portion 214 has a concave arc surface 214a, the second back plate portion 224 has a convex arc surface 224a, and the convex arc surface 224a and the concave arc surface 214a abut against each other. The second frame 220 is configured to rotate along the sliding movement of the convex arc surface 224a and the concave arc surface 214a relative to each other. That is, the second frame 220 is rotatably connected to the first frame 210 along the first axis A1 through the cooperation of the convex arc surface 224a and the concave arc surface 214a unlike the second frame 120 in the foregoing embodiment which is pivotally connected to the first frame 110 along the first axis A1 through the shaft portion 122 thereof. In this embodiment, the height of the first back plate portion 214 may be smaller than that of the second back plate portion 224, but needs to be higher than the convex arc surface 224a of the second back plate portion 224 so that the concave arc surface 214a thereof can be aligned with the convex arc surface 224a.

Figure 7:
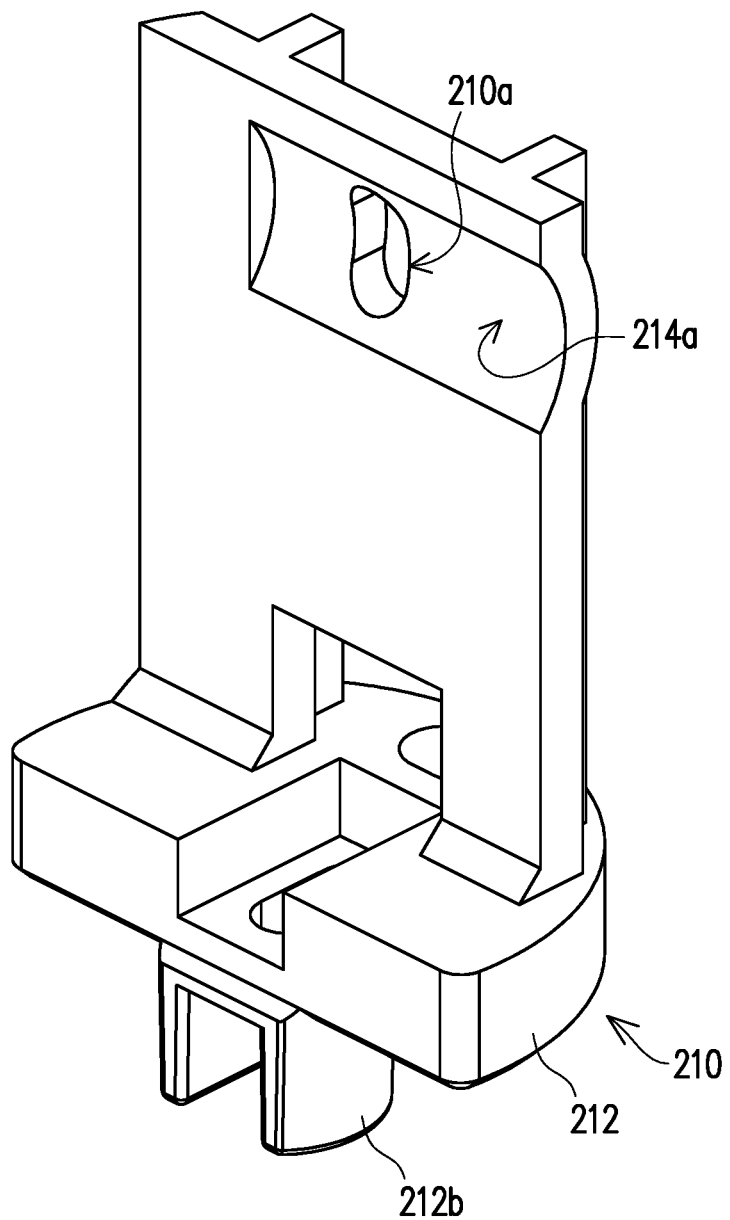
FIG. 7 is a perspective view of the first frame of FIG. 5.

Further, in the embodiment, the optical module 200 further includes a locking member 260. The first frame 210 has an opening 210a, and the second frame 220 has a locking hole 220a. The opening 210a is aligned with the concave arc surface 214a, and the locking hole 220a is aligned with the convex arc surface 224a. The locking member 260 passes through the opening 210a and is screwed to the locking hole 220a to restrict the second frame 220 from being separated from the first frame 210. FIG. 7 is a perspective view of the first frame of FIG. 5. The opening 210a is, for example, in the form of a long slot as shown in FIG. 7 and the aperture of the opening 210a in the extending direction is larger than the aperture of the locking hole 220a, so that the second frame 220 and the locking member 260 have sufficient degrees of freedom to rotate with respect to the first frame 210. In this embodiment, the convex arc surface 224a, the concave arc surface 214a, the opening 210a, the locking hole 220a, and the locking member 260 are aligned with the geometric center of the optical component 240, so that the first axis A1 of the embodiment can pass through the geometric center of the optical component 240 like the first axis A1 in the foregoing embodiment. Specifically, the convex arc surface 224a and the concave arc surface 214a are, for example, partial cylindrical surfaces having the same radius of curvature, and the centers of curvature of the convex arc surface 224a and the concave arc surface 214a are located at the geometric center of the optical component 240.

On the other hand, in the present embodiment, since the second frame 220 is connected to the first frame 210 through its second back plate portion 224 instead of being connected to the first frame 210 by its frame, a part of the frame of the second frame 220 can be omitted as shown in FIG. 5, and a part of the frame of the first frame 210 can also be correspondingly omitted to expose at least an edge 240a of the optical component 240. In this manner, other optical paths in the projector 50 can pass through the edge 240a of the optical component 240 to enhance the flexibility of the optical path design.

In summary, embodiments of the present disclosure have at least one of the following advantages or effects. In the optical module of the embodiment of the present disclosure, the second frame and the optical component are driven through the pillar swinging in the guiding slot or along the guiding slot to rotate around the first axis, so that the user can directly move the pillar to complete the adjustment operation on the first axis without using additional tools to make the adjustment, thereby improving operational convenience. Further, the adjustment portion of the first frame is not only configured to drive the first frame to rotate around the second axis, but also configured for the pillar to pass through, such that the second frame is driven to rotate around the first axis through the pillar swinging relative to the adjustment portion. That is, the optical module integrates the adjustment operation on the first axis and the adjustment operation on the second axis at the adjustment portion, so that the overall structure of the optical module is relatively simplified, thereby saving the configuration space inside the projector and reducing manufacturing and assembling costs. Moreover, the user can complete the adjustment operation on the first axis and the adjustment operation on the second axis by only operating the pillar and the adjustment portion from a single side of the projector, thereby facilitating the adjustment operation. Moreover, both the first axis and the second axis can pass through the geometric center of the optical component, so that the geometric center of the optical component does not shift during the above adjustment process to maintain good light extraction efficiency and imaging quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical module, comprising a first frame, a second frame, a pillar, and an optical component, wherein:
    the first frame has an adjustment portion, and the adjustment portion has a guiding slot;
    the second frame is rotatably connected to the first frame along a first axis;
    the pillar is connected to the second frame and is disposed through the guiding slot, and the pillar is configured to be subjected to force and swing in the guiding slot to drive the second frame to rotate around the first axis; and
    the optical component is disposed on the second frame.

2. The optical module according to claim 1, wherein the adjustment portion has a shaft portion and is rotatably connected to a base body by the shaft portion along a second axis, and the pillar passes through the shaft portion.

3. The optical module according to claim 2, wherein the adjustment portion is configured to engage with a jig and drive the first frame to rotate around the second axis through a force applied by the jig.

4. The optical module according to claim 2, wherein an extending direction of the guiding slot is perpendicular to the first axis and the second axis.

5. The optical module according to claim 1, wherein the optical module comprises an elastic member, the pillar comprises a passing-through portion and a stopping portion, and the passing-through portion is disposed in the guiding slot and connected between the stopping portion and the second frame, the elastic member is disposed between the stopping portion and the adjustment portion, the pillar is configured to swing along the guiding slot against an elastic force of the elastic member and is configured to be positioned by the elastic force of the elastic member.

6. The optical module according to claim 5, wherein the adjustment portion has at least one convex arc surface, and opposite two ends of the elastic member respectively abut against the at least one convex arc surface and the stopping portion.

7. The optical module according to claim 1, wherein the second frame has at least one shaft portion and is pivotally connected to the first frame along the first axis through the at least one shaft portion.

8. The optical module according to claim 1, wherein the first frame has a first back plate portion, the second frame has a second back plate portion, and the second back plate portion covers a back surface of the optical component, the first back plate portion has a concave arc surface, the second back plate portion has a convex arc surface, and the convex arc surface and the concave arc surface abut against each other, the second frame is configured to rotate around the first axis along with a sliding movement of the convex arc surface and the concave arc surface relative to each other.

9. The optical module according to claim 8, wherein the optical module comprises a locking member, wherein the first frame has an opening, and the second frame has a locking hole, the opening is aligned with the concave arc surface, the locking hole is aligned with the convex arc surface, the locking member passes through the opening and is screwed to the locking hole, and an aperture of the opening is larger than an aperture of the locking hole.

10. The optical module according to claim 1, wherein the second frame exposes at least one edge of the optical component.

11. A projector, comprising a light source, a light valve, a projection lens and an optical module, wherein:
    the light source is configured to provide an illumination beam;
    the light valve is disposed on a transmission path of the illumination beam, and configured to convert the illumination beam into an image beam; and
    the projection lens is disposed on a transmission path of the image beam, and configured to project the image beam to the outside of the projector;
    the optical module comprises a first frame, a second frame, a pillar, and an optical component, wherein:
        the first frame has an adjustment portion, wherein the adjustment portion has a guiding slot;
        the second frame is rotatably connected to the first frame along a first axis;
        the pillar is connected to the second frame and disposed through the guiding slot, wherein the pillar is configured to be subjected to force and swing in the guiding slot to drive the second frame to rotate around the first axis; and the optical component is disposed on the second frame and located on a transmission path of the illumination beam or the image beam.

12. The projector according to claim 11, wherein the adjustment portion has a shaft portion and is rotatably connected to a base body by the shaft portion along a second axis, and the pillar passes through the shaft portion.

13. The projector according to claim 12, wherein the adjustment portion is configured to engage with a jig and drive the first frame to rotate around the second axis through a force applied by the jig.

14. The projector according to claim 12, wherein an extending direction of the guiding slot is perpendicular to the first axis and the second axis.

15. The projector according to claim 11, wherein the optical module comprises an elastic member, the pillar comprises a passing-through portion and a stopping portion, and the passing-through portion is disposed in the guiding slot and connected between the stopping portion and the second frame, the elastic member is disposed between the stopping portion and the adjustment portion, the pillar is configured to swing along the guiding slot against an elastic force of the elastic member and is configured to be positioned by the elastic force of the elastic member.

16. The projector according to claim 15, wherein the adjustment portion has at least one convex arc surface, and opposite two ends of the elastic member respectively abut against the at least one convex arc surface and the stopping portion.

17. The projector according to claim 11, wherein the second frame has at least one shaft portion and is pivotally connected to the first frame along the first axis through the at least one shaft portion.

18. The projector according to claim 11, wherein the first frame has a first back plate portion, the second frame has a second back plate portion, and the second back plate portion covers a back surface of the optical component, the first back plate portion has a concave arc surface, the second back plate portion has a convex arc surface, and the convex arc surface and the concave arc surface abut against each other, the second frame is configured to rotate around the first axis along with a sliding movement of the convex arc surface and the concave arc surface relative to each other.

19. The projector according to claim 18, wherein the optical module comprises a locking member, wherein the first frame has an opening, and the second frame has a locking hole, the opening is aligned with the concave arc surface, the locking hole is aligned with the convex arc surface, the locking member passes through the opening and is screwed to the locking hole, and an aperture of the opening is larger than an aperture of the locking hole.

20. The projector according to claim 11, wherein the second frame exposes at least one edge of the optical component.

* * * * *